United States Patent [19]

Shaughnessey

[11] 4,009,706

[45] Mar. 1, 1977

[54] SYNTHETIC ORGANIC FLOCCULANTS TO CLARIFY RAW SUGAR LIQUOR

[75] Inventor: Paul Eugene Shaughnessey, Huntingdon Valley, Pa.

[73] Assignee: American Cyanamid Company, Stamford, Conn.

[22] Filed: June 18, 1976

[21] Appl. No.: 697,495

[52] U.S. Cl. .............................. 127/48; 127/46 R; 260/67.6 R
[51] Int. Cl.² .......................................... C13D 3/00
[58] Field of Search .......................... 127/46 R, 48; 260/67.6 R

[56] References Cited

UNITED STATES PATENTS

| | | | |
|---|---|---|---|
| 2,694,702 | 11/1954 | Jones | 127/48 X |
| 3,166,442 | 1/1965 | Duke | 127/48 |
| 3,479,221 | 11/1969 | Buhl | 127/48 X |
| 3,509,021 | 4/1970 | Woodward | 260/67.6 R |
| 3,513,126 | 5/1970 | Ehlers | 260/67.6 R |
| 3,567,512 | 3/1971 | Lyons | 127/48 |
| 3,698,951 | 10/1972 | Bennett | 127/46 R |
| 3,806,364 | 4/1974 | Gasco | 127/48 |
| 3,816,356 | 6/1974 | Grannen | 260/67.6 R |
| 3,853,616 | 12/1974 | Rundell | 127/48 |
| 3,926,662 | 12/1975 | Rundell | 127/48 |

OTHER PUBLICATIONS

Chemical Abstracts, 81:137806j (1974).
Chemical Abstracts, 82:126244u (1975).

*Primary Examiner*—Morris O. Wolk
*Assistant Examiner*—Sidney Marantz
*Attorney, Agent, or Firm*—William J. van Loo

[57] ABSTRACT

A combination of a cationic melamine:formaldehyde acid colloid and an anionic polyacrylamide are effective flocculants to clarify raw sugar liquor.

10 Claims, No Drawings

SYNTHETIC ORGANIC FLOCCULANTS TO CLARIFY RAW SUGAR LIQUOR

This invention relates to an improved process for refining raw sugar. More particularly, it relates to such a process wherein impurities present in the raw sugar are removed from the melted washed sugar by the use of a combination of an acid colloid of a melamine-formaldehyde resin and an anionic polyacrylamide.

The raw sugar which comes to the refinery consists of a crystal of practically pure sucrose, to which adhers a very thin film of the mother liquor from which the sugar was boiled (molasses). For example, a raw sugar testing 97.0° contains on an average 0.75% moisture and 2.25% impurities (invert sugar, inorganic ash, and organic matter), practically all of which are in the film of molasses. Refining is the process of separating the sucrose from the impurities as soon and as completely as possible.

The first step in refining raw sugar is to wash off the molasses film on the crystals. This operation is called affination. The raw sugar is sent to a mingler, where it is made into a thick artificial massecuite called a magma by thoroughly mixing with a warm, high-Brix syrup (the washings from previously affined sugar). The purpose of this step is to moisten the syrup on the surface of the crystal, and to put the raw sugar into a flowable state so it can be run into the affination machines. These are centrifugals (usually of the batch type although continuous types are applicable) in which the adhering softened syrup is spun off along with the mixing syrup. After spinning, the wall of sugar is washed with water to remove the residual syrup remaining on the crystals. In modern refineries completely automatic batch machines are gaining favor. The sugar is "cut out" into a scroll or vibrating conveyor below and conveyed to a melter, i.e., a dissolver. A portion of the sugar spun off comesback to mingle with more raw sugar, the surplus going to the bone char or the recovery system, or for clarification and char filtration for soft sugars or refiners syrup.

In the sugar industry, the term "melting" means "dissolving"; sugar is never actually melted in any part of the process. The washed sugar is melted, usually with light sweet waters from other stations of the refinery. These solvents must have approximately the same purity as the washed sugar to eliminate as much as possible, recirculation of impurities through the factory. Thus, light sweet waters from reclamation of sugar dust, or from reclamation of sucrose from clarifier muds and the like, can be used.

The melted sugar is coarsely screened to remove the coarser forms of foreign matter and then heated to the desired temperature, which depends on the clarification method to follow. The Brix (which indicates the grams of sugar in 100 ml. of solution) is adjusted by controlling the amount of solvent sweet water, or by adding water. This adjustment is almost universally done by automatic means.

The melted washed sugar is clarified before char treatment so that the liquor will be clean when it goes to the bone char, thus eliminating possible blockup of the char surface and to enhance the decolorizing power of the char by the use of a cleaner liquor. By far, the most widely used method for clarification involves phosphation in frothing clarifiers utilizing tricalcium phosphate floc. The frothing clarifiers depend on the formation of a gelatinous floc, which, when floated to the surface of the clarifier by means of occluded air and subsequent heating, entraps the impurities. The system of treating the liquor with phosphoric acid and lime is a very old one, and was utilized for many years, but until the development of the floc-flotation system, the tricalcium phosphate precipitate had to be removed by filtration with taylor bag filters, which was slow, laborious, and productive of excessive amounts of sweet water.

Frothing clarifiers properly operated produce a liquor of adequate clarity for char filtration (although some refineries follow with pressure filtration to ensure complete clarity) and greatly reduced color, amounting to 30–40% removal. This greatly reduces the color load on the char. These clarifiers are quite sensitive to variations in the quality of the raw and work better on high-quality raws than on inferior raws. They produce a comparatively large amount of scums and about 5% of the entering sucrose must be recovered from these scums. If such recovery is rapid and efficient, no appreciable inversion occurs and the resultant sweet water is utilizable for melting. These clarifiers have the advantage of complete continuous operation, and are readily adapted to automation.

Because of the high percentage of sugar in the scums, its recovery is obviously important. Various methods have been used; for example, a series of dilutions reducing the Brix each time, settling, decanting the clear solution, and finally filter-pressing the bottoms or solids remaining. The disadvantage of this method is that the solutions remain at high temperatures and thin Brixes for too long a time, so that appreciable inversion takes place.

Filtration of the scums on rotary vacuum drum filters is possible, but requires a high percentage of filter aid, which is expensive. The best method used now consists of removing the solids from the diluted scums by means of supercentrifuges. These are smaller than the regular centrifugals, but operate at a much higher speed. They offer important advantages, e.g., labor savings and reduced sugar loss in sweet waters due to reduced time in process. Usually, less sweet water is produced. The principal disadvantages of the super centrifuge are the relatively high maintenance costs and the initial cost.

In carrying out clarification as described, current practice is generally to operate with a sugar melt of about 60 Brix using about 350 ppm of $H_3PO_4$ and 500 ppm of CaO. Under these conditions of operation, sugar yield is reduced by 3 pounds for each pound of lime added. Additional losses arise due to the high temperature of operation and the variations in pH extremes that occur. Due to post-precipitation problems which occur in processing, there is an increased load placed on the filter presses, which causes shortened filter runs and an increased consumption of diatomaceous earth filter media and an increased problem of disposal thereof.

Worldwide, sugar is presently in short supply and ever increasing demands are made upon the sugar supply. As a result, the price of sugar has soared over the past several years. Accordingly, losses in sugar that accompany refining thereof represent a serious economic problem as well as a diminution of the available supply. Therefore, any improved process that minimizes losses of sugar due to processing and is readily performed would constitute a signficant advance in the art and would tend to have an effect in alleviating the shortage of sugar supply.

In accordance with the present invention, there is provided a process for refining a raw sugar liquor containing flocculatable impurities and ready for clarification which comprises adding to said sugar liquor an effective amount to flocculate said impurities of the combination of a melamine: formaldehyde acid colloid and a polyacrylamide containing from about 3 to 40 mole percent of its repeating units in the form of sodium acrylate groups and having a molecular weight of at least 0.5 million and thereafter clarifying said sugar liquor.

In preferred embodiments, the present process is run with the complete elimination of phosphoric acid and lime coventionally employed. Under such conditions, equal clarification can be effected at lower temperatures than those required by the phosphoric acid/lime process, thus resulting in less sugar inversion. In addition, the present process generates only about 1/20 of the sludge generated in the phosphoric acid/lime process, thus reducing the problem of recovery of residual sugar from the sludge and of sludge disposal. The present process, by avoiding lime usage, eliminates sugar losses due to lime usage. The present process also avoids post-precipitation problems that occur in the phosphoric acid/lime process and thereby provide longer filter runs with resulting savings in consumption of diatomaceous earth filter media and reduced disposal problems associated therewith.

The present process may be employed in conjunction with reduced usage of phosphoric acid and lime to achieve a portion of the benefits obtained by sole use of the combination of the invention. For example, by using about one half of the amounts of phosphoric acid and lime conventionally required, about one half the amount of the combination of the present invention can be used and there will result lower losses of sugar and less processing difficulties that are conventionally occasioned. Such combined usages may result in economic advantages in material costs while still providing increased sugar yields.

The first agent of the combination of the present invention is a melamine:formaldehyde acid colloid. Acid colloids of melamine:formaldehyde condensates have been known for a long time for use in a variety of applications. These colloids may be prepared by certain alternative procedures. One method of preparation is to dissolve the condensate in water to which a definite amount of acid has been added and the resin-acid solution is then allowed to age. As ageing proceeds, the resin condenses into particles within the colloidal range, i.e., about 20 to 200 Angstrom units with the probability that particles even smaller are present. The colloidal state is evidenced by the appearance of a blue haze in the dispersion. The average degree of polymerization is reported to be in the neighborhood of 10 to 20 and the average molecular weight is reported to be somewhere between 1,700 and 4,000. Recent studies indicate much greater values. It is believed that the melamine-formaldehyde condensate forms a monobasic acid salt which ionizes to a cation containing the melamine:formaldehyde plus one hydrogen, and an anion derived from the acid employed.

An alternative procedure involves admixture of melamine, formaldehyde, and aqueous acid in suitable amounts with sufficient heating to dissolve the melamine followed by cooling and ageing to develop the blue haze characteristic of the colloid.

Still another procedure is to dissolve the melamine: formaldehyde condensate into water containing acid and effecting ageing at a temperature in the range of about 50 to 90° C. until the characteristic blue haze is developed. Preparation of the colloids at elevated temperatures provides full development within several hours. Colloids prepared at room temperature generally develop their characteristic blue haze in 18 to 24 hours but do not develop their full flocculating ability until several weeks after preparation. Colloids prepared at elevated temperature, on the other hand, develop their full flocculating ability as soon as the characteristic blue haze is developed.

In preparing colloids for use in accordance with the present invention, a melamine-formaldehyde resin is employed as the primary resin to be converted to the colloidal state. Such resin may be composed exclusively of melamine and formaldehyde in various molar ratios or it may contain additional ingredients so long as such added ingredients do not interfere in the preparation of stable acid colloids of the melamine resin. Thus, the melamine resin may be fully or partially etherified with a suitable alcohol, may be a co-condensate of melamine and other aminoplast type reactant with formaldehyde, which co-condensate may be fully or partially etherified, or may be a physical mixture of a melamine-formaldehyde condensate as described with another aminoplast resin so long as stable acid colloids are provided. Generally, the ratio of formaldehyde to melamine will be about 1.8–8 to 1 on a molar basis with additional formaldehyde used to satisfy partial or full molar requirements of other aminoplast reactants which may be present. Normally, melamine will react with up to six moles of formaldehyde and such resins may be used. In certain instances, a so-called "fortified colloid" may be desired, such product containing up to about 12 moles of formaldehyde per mole of melamine. Such products may also be used.

The melamine resins, as defined, should be dispersible in the aqueous acid medium so that the characteristic acid colloid can be obtained. Generally, the melamine resins are readily water-soluble but in some forms, such as dry powders, may be more readily soluble in acidified water used in conjunction with acid colloid formation. Thus, in preparing the acid colloid, the melamine resin may go directly from the dissolved state to the colloidal state or it may go from undissolved to dissolved state and eventually to the colloid state.

In conjunction with the melamine resin in colloid formation, an acid is also required. Generally an acid having an ionization constant greater than about $10^{-5}$ can be used to form an acid colloid. Thus, acids such as formic, acetic, and lactic may be used. However, it is generally preferred to use a strong mineral acid to prepare the colloid since less acid is required and such acids are inexpensive. Depending upon the particular acid selected, the amount thereof required will vary over wide ranges. For useful weak acids, generally from about 1 to 6 moles of acid per mole of melamine present will provide a stable colloid. For useful strong acids, generally from about 0.4 to 1.0 mole of acid per mole of melamine present will provide a stable colloid. Preferably the acid employed is hydrochloric acid in the range of about 0.4 to 1.0 mole of acid per mole of melamine present. The acid employed should be water-soluble to the extent present in colloid preparation.

In addition to the specified resin and acid, water is an essential ingredient in preparing the acid colloids. Water may be the sole medium employed or there may be present water-soluble substances such as alcohols, glycols and the like, so long as their presence does not adversely affect colloid formation and stability. It is of course, greatly preferred to use water as the sole medium for economic reasons. The amount of aqueous medium employed will generally be sufficient so that the resin content of the colloid being prepared will be in the range of about 5 to 15 weight percent, preferably about 8 to 12 weight percent.

In preparing the composition for providing the acid colloid, any order of addition of ingredients is possible. Thus, the water may be added to acidified resin, the resin to acidified water, or acid to the resin-water mixture or solution, etc. Generally, it is preferred to add the acid at the time it is desired to initiate acid colloid formation.

As indicated, the colloids are preferably prepared at a temperature in the range of 50°–90° C., more preferably at a temperature in the range of 65°–80° C. In carrying out such preparation, it is necessary that the composition be at a temperature in this range as the colloid is being formed. It is possible to mix all ingredients at ambient temperature and heat the resulting composition to the desired temperature range, at which it is held until the characteristic blue haze is fully developed. Alternatively, the water, and other ingredients if desired, may be separately brought to the desired temperature so that upon mixing the desired temperature range is achieved and maintained. The time requied to develop fully the characteristic blue haze will vary depending upon the temperature employed, the concentration of resin in the composition as well as its type, and the amount and type of acid employed. However, use of the temperature range specified by the present invention will lead to a shorter time to develop fully the characteristic blue haze of the colloid compared to use of temperatures below this range.

The characteristic blue haze of the acid colloid is a manifestation of the Tyndall effect associated with colloidal materials and indicates the path of light through the heterogeneous medium, the path being made visible by the solid particles. By the expression "fully developed", as that and similar expressions are used herein, is meant that the acid colloid obtained will be at or close to maximum flocculating efficiency as compared to a fully aged product of comparable composition prepared by the conventional low temperature procedures. Once the desired flocculating efficiency is obtained at the specified aging temperature, as determined by test, the temperature of the developed colloid is reduced to ambient temperature and the colloid is ready for use. The cooled colloid exhibits good stability against gelation and thus is useful over adequate time period. Dilution will extend stability.

A problem that can arise with the use of most conventional acid colloids of melamine-formaldehyde condensates in flocculation processes is the high level of free formaldehyde present in the water recovered from the flocculation process. Free formaldehyde can react with hydrochloric acid to form symmetrical bis-chloromethyl ether, which is a potential carcinogen. The Environmental Protection Agency [EPA] requires that less than 0.1 part per million of formaldehyde and less than 0.05 part per million of melamine be present in clarified water that is to be used for drinking purposes. Acid colloids obtained from melamine-formaldehyde condensates having a molar ratio of formaldehyde to melamine in the conventional range i.e., from about 3–12:1, respectively, do not meet the EPA requirements for free formaldehyde in the clarified water. If the formaldehyde to melamine ratio is too low, the acid colloids thus obtained do not meet the EPA requirements for free melamine in the clarified water. Low ratios of formaldehyde to melamine in the condensate used in said colloid preparation require longer times to develop full effectiveness in flocculation applications than do the conventional higher ratios. Accordingly, the EPA requirements as to free formaldehyde and free melamine present in the clarified water further complicate the problems associated with the use of acid colloids in flocculation processes. In order to meet EPA requirements, it is necessary to use as the acid colloid one which has been prepared from a melamine-formaldehyde condensate having a formaldehyde to melamine ratio in the range of about 1.8 to 2.2, respectively, at from about 5 to 15 weight percent concentration in aqueous medium using from about 0.65 to 6.0 moles of a suitable acid per mole of melamine present and preferably aging at a temperature of about 50° to 90° C. until the characteristic blue haze is fully developed.

Although the above-described acid colloid of low formaldehyde may be aged at lower temperatures, such a colloid does not develop its full flocculating efficiency until several weeks or more after the characteristic blue haze is developed. Accordingly, it is greatly preferred to prepare the colloid from a melamine:formaldehyde condensate of low formaldehyde content to satisfy the EPA requirements and to age at elevated temperatures to develop more rapidly the full flocculating efficiency.

The second agent of the combination of the present invention is an anionic polyacrylamide. The useful polyacrylamide will contain from about 3 to 40, preferably 10 to 30 mole percent of its repeating units in the form of sodium acrylate groups and will have a molecular weight of at least about 0.5 million, preferably 0.5 to 30 million and more preferably, 10–20 million. Such a polymer may be obtained by free radical polymerization of appropriate amounts of an acrylic acid and an acrylamide and neutralizing to form the sodium salt. Alternatively, the polymer may be obtained by partial hydrolysis of a polyacrylamide. Although it is preferable to use copolymers of acrylamide and sodium acrylate, it is possible to use polymers in which a portion of the acrylamide repeating units is replaced by another monomer which does not change the essential character of the acrylamide/sodium acrylate copolymer.

The amounts of the melamine:formaldehyde acid colloid and anionic polyacrylamide used in the present invention will be those amounts which provide effective flocculation of the impurities in the raw sugar liquor. The particular amount of these agents that is effective in flocculation in given instances will vary widely depending upon the amount and nature of the impurities present in the raw sugar, the specific agents employed, the provision for or lack of provision for reduced usage of phosphoric acid and lime, and numerous other factors. The specific amounts are readily determined by trial runs. Generally, the amount of melamine:formaldehyde acid colloid will be in the range of about 300 to 5,000 parts per million parts of raw sugar liquor, preferably about 500 to 3,000 ppm. Generally, the amount of the anionic polyacrylamide will be in the range of about 1 to 25 parts per million parts of raw sugar liquor, preferably about 1 to 10 ppm.

The agents can be added in any order of addition, i.e., the anionic polyacrylamide first and the melamine-formaldehyde acid colloid second or, conversely, the melamine:formaldehyde acid colloid first and the anionic polyacrylamide second, the latter being generally preferred.

Clarification is a process in the refining of sugar that is carried out subsequent to melting of the raw sugar and screening of the raw sugar liquor obtained but prior to decolorization and crystallization. Since the preceeding and subsequent processing are carried out at elevated temperatures, it is convenient to carry out clarification at elevated temperatures. Typically, clarification is carried out at temperatures near or at the boil at atmospheric pressure although temperatures up to about 240° F. under superatmospheric pressure may be used. It is generally preferred to operate at atmospheric pressure and as low a temperature as is effective in order to minimize inversion. The process of the present invention may be run at conventional temperatures, preferably in the range of about 150°–190° F., more preferably in the range of about 160°–185° F. This range is generally lower than that normally required using phosphoric acid/lime and can reduce inversion associated with clarification. Thus, the process of the present invention embraces the conventional clarification temperature range, but can be effectively carried out at lower temperatures within the range which can be advantageous as to sugar losses by inversion.

After the combination of cationic melamine-formaldehyde acid colloid and anionic polyacrylamide have been added to the sugar liquor, the flocculated impurities are removed as in the process employing phosphoric acid/lime. This is generally accomplished by use of air flotation clarifiers to remove the majority of impurities and then suitable filters, such as a Vallez press using diatomaceous earth filter media to complete impurity removal. The present process produces only about 1/20 of the sludge produced by the phosphoric acid/lime process. As a result filtration is more readily effected, longer filter runs are provided, and consumption of filter media is greatly reduced, also reducing disposal problems associated therewith. The reduced sludge generated by the process of the present invention minimizes the problems of washing the sludge, recovering sugar therefrom, and disposal of the sludge.

The invention is more fully illustrated by the examples which follow, wherein all parts and percentages are by weight unless otherwise specified.

EXAMPLE 1

To a 1 liter sample of 60% raw sugar liquor were added 1900 parts per million of a melamine-formaldehyde hydrochloric acid colloid, in which the ratio of melamine:formaldehyde was 1:2. Following this addition, there were added 4 parts per million of an anionic polyacrylamide having 20 mole percent of its repeating units in the form of sodium acrylate groups and having a molecular weight of about 15 million. Clarification was run at 160°. using air bubbles to cause the flocculated solids to float. Excellent clarity was achieved with no loss of sugar due to lime consumption.

COMPARATIVE EXAMPLE A

Following the procedure of Example 1 in every material respect except for the flocculants used, a conventional run was made using 350 parts per million of $H_3PO_4$ and 500 parts per million of CaO. Clarification was run at 190° F. Excellent clarity was achieved with a loss of 1500 parts per million of sugar due to lime consumption. The volume of sludge generated was 20 times the amount obtained in Example 1 which resulted in a longer filter run and excessive sludge for further processing.

EXAMPLE 2

The procedure of Example 1 is again followed in every material respect except for the flocculants used. In this run 950 parts per million of the acid colloid of Example 1 are used, followed by 2 parts per million of the anionic polyacrylamide of Example 1. In addition, there are also used 175 parts per million of $H_3PO_4$ and 250 parts per million of CaO. Clarificaton is run at 190° F. Equivalent clarity to that obtained in Comparative Example A is obtained with loss of only 750 parts per million of sugar due to lime consumption. Sludge volume is reduced to about half that of Comparative Example A.

I claim:
1. A process for refining a raw sugar liquor containing flocculatable impurities and ready for clarification which comprises adding to said sugar liquor an amount effective to flocculate said impurities of the combination of a cationic melamine:formaldehyde acid colloid and an anionic polyacrylamide containing from about 3 to 40 mole percent of its repeating units in the form of sodium acrylate groups and having a molecular weight of at least about 0.5 million and thereafter clarifying said sugar liquor.
2. The process of claim 1 wherein said acid colloid has a melamine:formaldehyde ratio in the range of about 1:1.8 to 1:2.2.
3. The process of claim 1 wherein said acid colloid is used in amounts in the range of about 300 to 5000 parts per million parts of raw sugar liquor.
4. The process of claim 1 wherein said acid colloid is used in amounts in the range of about 500 to 3000 parts per million parts of raw sugar liquor.
5. The process of claim 1 wherein said anionic polyarcylamide contains from about 10 to 30 mole percent of its repeating units in the form of sodium acrylate groups.
6. The process of claim 1 wherein said anionic polyacrylamide has a molecular weight in the range of about 10 to 20 million.
7. The process of claim 1 wherein said anionic polyacrylamide is used in amounts in the range of about 1 to 25 parts per million parts of raw sugar liquor.
8. The process of claim 1 wherein in addition to the cationic melamine:formaldehyde acid colloid and the anionic polyacrylamide there is added up to about 175 parts of phosphoric and up to about 250 parts of CaO per million parts of raw sugar liquor.
9. The process of claim 1 wherein clarification is carried out at a temperature in the range of about 160°–185° F.
10. The process of claim 1 wherein said cationic melamine:formaldehyde acid colloid is used in amounts of about 300 to 5000 parts per million parts of raw sugar liquor and said anionic polyacrylamide is used in amounts of about 1 to 25 parts per million parts of raw sugar liquor.

* * * * *